UNITED STATES PATENT OFFICE.

ROBERT WIMMER, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

STABLE INDIGO-WHITE AND PROCESS OF MAKING SAME.

No. 910,889.     Specification of Letters Patent.     Patented Jan. 26, 1909.

Application filed October 3, 1907. Serial No. 395,789.

*To all whom it may concern:*

Be it known that I, ROBERT WIMMER, doctor of philosophy and chemist, subject of the King of Bavaria, residing at Ludwigshafen-on-the-Rhine, Germany, have invented new and useful Improvements in Stable Indigo-White Preparations and Processes of Making the Same, of which the following is a specification.

In the specification of Patent No. 833,654 is described the production of solid stable alkali salts of indigo white by evaporating a solution of one, or more, of the said alkali salts in a vacuum. I have now discovered that if sulfite cellulose waste liquor be mixed with a solution of an alkali salt of indigo white, or alkali salts of indigo white, and if the resulting solution be evaporated in a vacuum, the removal of the water is effected more easily and a better product is obtained than is the case if the aforesaid waste liquor be not employed. The sulfite cellulose waste liquor used in carrying out this invention is, for instance, such as is obtained in the manufacture of cellulose by treating wood fiber with sulfurous acid, or with a bisulfite, and then removing, by filtration, or otherwise, the cellulose obtained. The aforesaid waste liquor must be neutral, or must contain so little acid that no indigo white is set free. It exhibits on evaporation a tendency to froth and form bubbles and in consequence thereof the removal of water, and especially of the last traces of water, is facilitated, whereas when a solution of an alkali salt, or of alkali salts, of indigo white is evaporated without any addition in accordance with this invention, there is a tendency to the formation of hard lumps which often inclose some of the solution being evaporated and which are completely dehydrated with great difficulty.

Further advantages obtained by the use of the present invention are that the product obtained is more stable in the air and is also more easily soluble in water than is the case with the product of the process of the aforementioned specification.

The following is an example of how my present invention can be carried out in practice, but my invention is not confined to this example. The parts are by weight. Mix three hundred and fifty (350) parts of a neutral concentrated sulfite cellulose waste liquor (containing about fifty (50) per cent. of solid matter) with a solution of an alkali salt of indigo white, obtained, for instance, as described in the specification of Patent No. 820,900, by reducing five hundred (500) parts of indigo powder with two hundred and fifty (250) parts of iron powder in the presence of one hundred and twenty (120) parts of caustic soda and six hundred and forty (640) parts of water and then filtering off the iron mud. Evaporate the mixture in a vacuum at the temperature of the water bath until no more water is given off. On cooling, a friable porous product is obtained which is easily soluble in water and can be employed directly for dyeing purposes.

Now what I claim is:

1. The new composition of matter being a solid stable preparation consisting of alkali salt of indigo white and sulfite cellulose waste which preparation is easily soluble in water and adapted for direct use in a vat.

2. The process of producing a solid stable preparation containing alkali salt of indigo white by evaporating in a vacuum a mixture of a solution of alkali salt of indigo white with sulfite cellulose waste liquor.

In testimony whereof I have hereunto set my hand in the presence of two subscribing witnesses.

ROBERT WIMMER.

Witnesses:
   ERNEST F. EHRHARDT,
   J. ALEC. LLOYD.